US008312375B2

(12) United States Patent
Hamada

(10) Patent No.: US 8,312,375 B2
(45) Date of Patent: Nov. 13, 2012

(54) DIGITAL MIXER

(75) Inventor: Atsuo Hamada, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 1059 days.

(21) Appl. No.: 11/490,986

(22) Filed: Jul. 20, 2006

(65) Prior Publication Data

US 2007/0022378 A1 Jan. 25, 2007

(30) Foreign Application Priority Data

Jul. 22, 2005 (JP) ................................. 2005-212185

(51) Int. Cl.
*G06F 17/00* (2006.01)

(52) U.S. Cl. ........... 715/716; 381/103; 700/90; D14/496

(58) Field of Classification Search .................. 715/716; 381/103; D14/496; 700/90
See application file for complete search history.

(56) References Cited

U.S. PATENT DOCUMENTS 7,363,443 B2 * 4/2008 Rubin ........................... 711/159
7,392,103 B2 * 6/2008 Takahashi ....................... 700/94
2002/0174202 A1 * 11/2002 Kohyama et al. ............. 709/220
2003/0059066 A1 3/2003 Kohyama et al.

FOREIGN PATENT DOCUMENTS

JP 2003-100066 4/2003

OTHER PUBLICATIONS

DM 2000 Digital Production Console. Owner's Manual [online]. Yamaha Corporation, 2002 [retrieved on Oct. 10, 2008]. Retrieved from the Internet: <URL: http://www2.yamaha.co.jp/manual/pdf/pa/english/mixers/DM2000E.pdf>.*

"PM5D Digital Mixing Console, PMD5—PMD5-RH Owner's Manual", Yamaha Corporation, Japan.

* cited by examiner

*Primary Examiner* — Tadeese Hailu
*Assistant Examiner* — Darrin Hope
(74) *Attorney, Agent, or Firm* — Morrison & Foerster LLP

(57) ABSTRACT

A screen displayed in response to the selection of a tag button is called a tag screen and groups of the tag screens corresponding to the tag buttons are called screen groups. One of the screen groups is assigned to a home button as a home screen group, and clicking this home button when an arbitrary screen is displayed causes a large display to display a setting screen belonging to the home screen group. Here, in each of the screen groups, the selected tag button, the position of a mouse cursor, and so on are saved, and when an original screen is switched to another screen during an adjustment work or the like and the original screen is thereafter displayed again, the adjustment work or the like that was executed in the original screen can be continued at once.

6 Claims, 8 Drawing Sheets

DIGITAL MIXER

BACKGROUND OF THE INVENTION

1. Field of the Invention

The invention relates to a digital mixer and a program therefor suitably used in mixing audio signals.

2. Description of the Related Art

In accordance with digitization, mixers in recent years have come to be more multifunctional to allow a user to make various settings. Disposing all controls and displays for realizing these plural functions on an operation panel is not realistic because the operation panel needs to have an enormous area. Therefore, in general practice, a multi-purpose large display is provided on an operation panel and the setting contents of various kinds are displayed by switching functions of the large display. In such a digital mixer, if the selection of a setting screen relies only on a user's screen specifying operation, a user has to perform complicated operations for screen selection, and therefore, Japanese Publication of Unexamined Patent Application No. 2003-100066 discloses an art in which, based on a user's operation, for example, an operation relating to tone parameter setting, a corresponding setting screen is automatically displayed on a large screen.

SUMMARY OF THE INVENTION

When a digital mixer is operated, there sometimes occurs a case where some specific screen among screens to be displayed on a large display is frequently displayed. For example, in a case where frequency characteristics of outputted audio signals are adjusted according to an acoustic characteristic in a concert hall, a screen of a graphic equalizer for the adjustment is frequently displayed. In such a case, it is convenient if the frequently used screen can be displayed by a common operation.

The invention was made in view of the above-described circumstances and an object thereof is to provide a digital mixer and a program therefor capable of displaying a frequently used screen with a simple operation, thereby realizing high operability.

To attain the above object, the invention is characterized in that it includes the following structure. In the parentheses, examples are shown.

A digital mixer of the invention includes: an operation panel including a display (14), a plurality of select buttons (280-1 to 280-6) corresponding to a plurality of screen groups respectively, the screen group being a group of screens (tag screens) which are to be displayed on the display, and a home button (38); a memory (22) that stores screen specifying data (tag numbers TB) corresponding to each of the plural screen groups and each indicating one screen (tag screen) out of the plural screens belonging to the corresponding screen group, and home data (HSB) indicating one screen group out of the plural screen groups; a first display controller (SP2 to SP8) that, in response to an operation of one select button out of the plural select buttons, stores screen specifying data (tag number TB) indicating a screen (tag screen) currently displayed on the display (14), in the memory as screen specifying data corresponding to a screen group to which the currently displayed screen belongs, and selects a screen indicated by screen specifying data (tag number TB) corresponding to a screen group corresponding to the operated select button to cause the display to display the selected screen; a second display controller (SP12 to SP18) that, in response to a predeteremined screen switching operation (operations of tag buttons 31 to 34 and so on), switches a screen (tag screen) to be displayed on the display to another screen (another tag screen) in the screen group to which the currently displayed screen (tag screen) belongs; a home assigner (SP44) that, in response to a predetermined home assigning operation (long pressing of home buttons 38 or 302), selects one select button out of the plural select buttons to store data (SB) indicating the selected select button into the memory as the home data (HSB); and a third display controller (SP48, SP2 to SP8) that, in response to a predetermined home displaying operation of the home button (38) (short pressing of the home buttons 38 or 302), stores the screen specifying data (tag number TB) indicating the screen currently displayed on the display, into the memory as the screen specifying data corresponding to the screen group to which the currently displayed screen belongs, and selects a screen indicated by screen specifying data (tag number TB) corresponding to a screen group corresponding to the select button indicated by the home data to cause the display to display the selected screen.

Further, in such a digital mixer, preferably, the home assigning operation is a predetermined operation (long pressing) performed to the home button (38), the digital mixer further includes a determiner (SP42) that determines, according to how the home button (38) is operated, whether or not the home assigning operation has been performed, the third display controller (SP48, SP2 to SP8) operates in a case where a result of the determination by the determiner (SP42) is negative, and the home assigner (SP44) operates in a case where the result of the determination by the determiner (SP42) is affirmative.

Preferably, the digital mixer further includes: a detector (CPU 18) that detects that no operation has been performed in the operation panel for a predetermined time or longer; and a fourth display controller (SP64) that, when the detector (CPU 18) detects that no operation has been performed in the operation panel for the predetermined time or longer, stores the screen specifying data (tag number TB) indicating the screen (tag screen) currently displayed on the display, into the memory as the screen specifying data corresponding to the screen group to which the currently displayed screen belongs, and selects the screen indicated by the screen specifying data corresponding to the screen group corresponding to the select button indicated by the home data to cause the display to display the selected screen.

Preferably, the digital mixer further includes a channel selector (SEL keys 248-1 to 248-P) that selects one channel from a plurality of channels of audio signals, and each of the first to third display controllers (SP2 to SP8) displays data on the channel which is selected by the channel selector before each of the first to third display controllers is activated, on the screen displayed by each of the first to third display controllers (SP2 to SP8).

A program of the invention is a program containing program instructions executable by a processor (18) provided in a digital mixer including: an operation panel including a display (14), a plurality of select buttons (280-1 to 280-6) corresponding to a plurality of screen groups respectively, the screen group being a group of screens (tag screens) which are to be displayed on the display, and a home button (38); and a memory (22) that stores data, and the program causing the processor (18) to execute: a first display control process (SP2 to SP8) that, in response to an operation of one select button out of the plural select buttons, stores screen specifying data (tag number TB) indicating a screen (tag screen) currently displayed on the display (14), into the memory (22) as screen specifying data corresponding to a screen group to which the currently displayed screen belongs, and selects a screen indicated by screen specifying data (tag number TB) corresponding to a screen group corresponding to the operated select button to cause the display to display the selected screen; a second display control process (SP12 to SP18) that, in response to a predeteremined screen switching operation (operations of tag buttons 31 to 34 and so on), switches a screen (tag screen) to be displayed on the display to another screen (another tag screen) in the screen group to which the currently displayed screen (tag screen) belongs; a home assigning process (SP44) that, in response to a predetermined home assigning operation (long pressing of home buttons 38 or 302), selects one select button out of the plural select buttons to store data (SB) indicating the selected select button into the memory as home data (HSB); and a third display control process (SP48, SP2 to SP8) that, in response to a predetermined home displaying operation of the home button (38) (short pressing of the home buttons 38 or 302), stores the screen specifying data (tag number TB) indicating the screen currently displayed on the display, into the memory as the screen specifying data corresponding to the screen group to which the currently displayed screen belongs, and selects a screen indicated by screen specifying data (tag number TB) corresponding to a screen group corresponding to the select button indicated by the home data to cause the display to display the selected screen.

The above and other objects, features and advantages of the invention will be apparent from the following detailed description which is to be read in conjunction with the accompanying drawings.

BRIEF DESCRIPTION OF THE DRAWINGS

FIG. 2 is a block diagram of mixing algorithm realized in a signal processing section 10 and so on;

DETAILED DESCRIPTION OF THE PREFERRED EMBODIMENTS

Hereinafter, the best mode for carrying out the invention will be concretely described based on the drawings.

1. Hardware Configuration of Embodiment

Next, the hardware configuration of a digital mixer 1 of one embodiment of the invention will be described with reference to FIG. 1.

Figure 1:
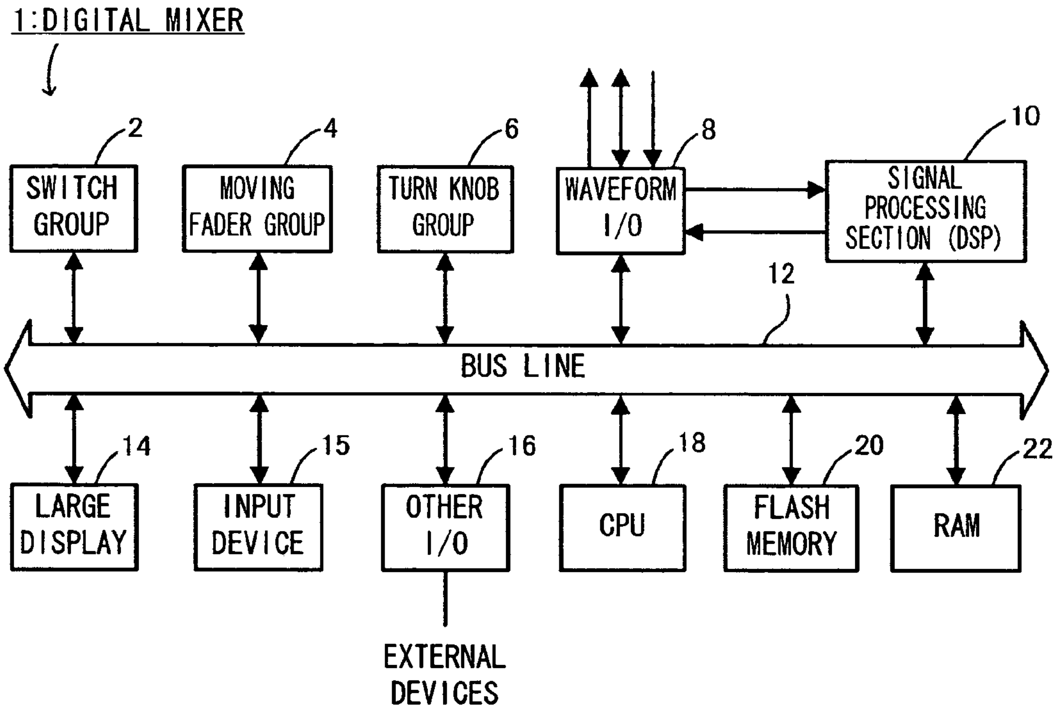
FIG. 1 is a hardware block diagram of a digital mixer 1 according to one embodiment of the invention.
Figure 4:
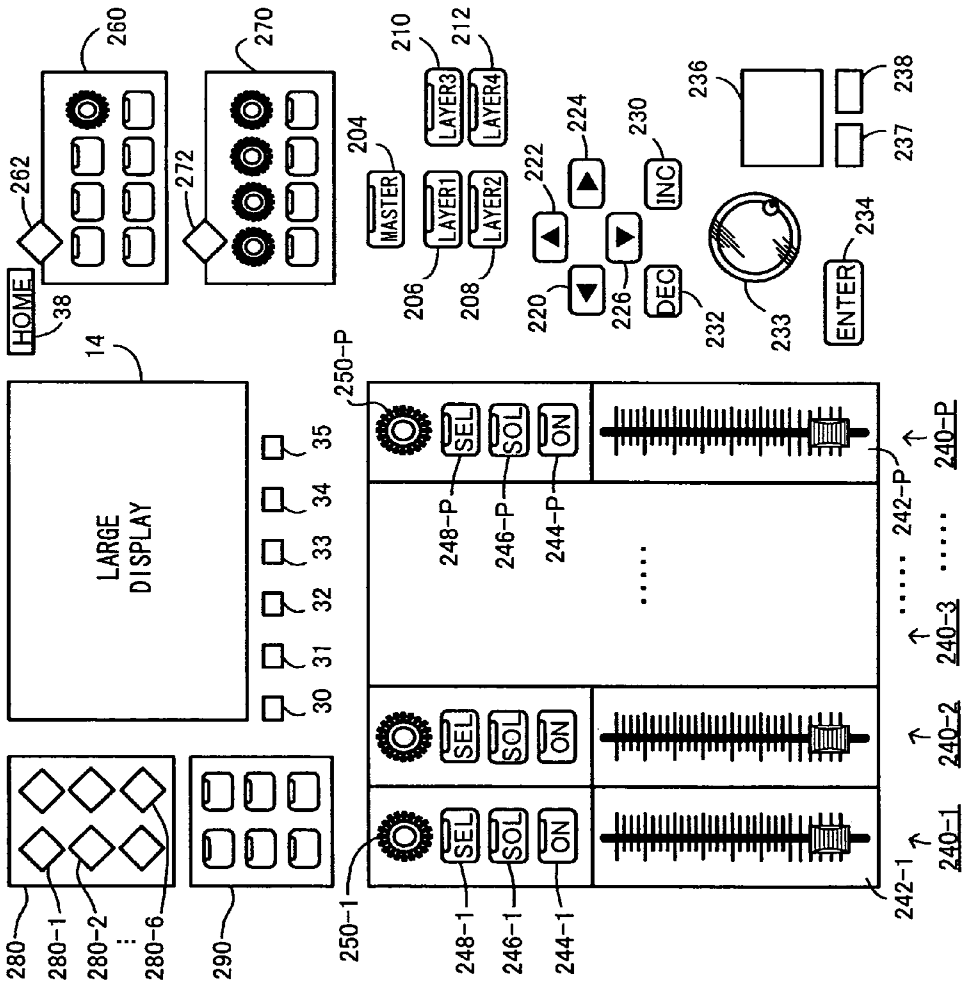
FIG. 4 is a plane view of a main part of an operation panel of the digital mixer 1.

In FIG. 1, 4 denotes a moving fader group that adjusts signal levels of input/output channels based on an operation by an operator. Further, the moving fader group 4 is structured so that an operation position thereof is automatically set when an operation command is supplied via a bus line 12. The moving fader group 4, which will be described in detail later, is composed of a plurality of (P-channel) moving faders 242-1 to 242-P (see FIG. 4).

2 denotes a switch group that is composed of various kinds of switches and LED keys, and ON/OFF states of LEDs provided in the LED keys are set via the bus line 12. 6 denotes a turn knob group that is composed of turn knobs 250-1 to 250-P (see FIG. 4) and so on for setting right/left volume balance of the respective input/output channels. Operation amounts of these turn knobs are outputted via the bus line 12. 8 denotes a waveform I/O section to/from which analog audio signals or digital audio signals are inputted/outputted. In this embodiment, mixing processing, effect processing, and so on of various audio signals are all executed by digital processes. However, audio signals inputted from an external part and audio signals to be outputted to an external part are possibly both digital signals and analog signals. Therefore, the waveform I/O section 8 executes processing such as conversion to/from analog signals from/to digital signals and conversion among plural kinds of digital signals.

Next, 10 denotes a signal processing section that is composed of a group of DSPs (digital signal processors). The signal processing section 10 applies mixing processing and effect processing to digital audio signals supplied via the waveform I/O section 8 to output the result to the waveform I/O section 8. 14 denotes a large display that is constituted by, for example, a flat panel display having resolution of, for example, about "1024×768". 15 denotes an input device that is composed of various controls on an operation panel, a keyboard, a mouse, and so on and is used for moving a cursor on the large display 14, for an ON/OFF operation of buttons displayed on the large display 14, and the like. 16 denotes other I/O section to/from which a time code and other data are inputted/outputted from/to external devices. 18 denotes a CPU that controls the respective sections via the bus line 12 based on a later-described control program. 20 denotes a flash memory that has the abovementioned control program stored in a program area provided therein. 22 denotes a RAM that is used as a work memory of the CPU 18.

In the digital mixer 1 of this embodiment, various kinds of parameters (current data) for controlling a current operation are stored in a predetermined area (current area) of the RAM 22. That is, by operating the switch group 2, the moving fader group 4, the turn knob group 6, and the input device 15, the contents of the current data are updated, and based on the current data, the mixing processing and the effect processing in the signal processing section 10, a display state in the large display 14, ON/OFF states of the LEDs of the switch group 2, positions of the faders of the moving fader group 4, and so on are controlled. The current data can be stored any time as scene data into a predeteremined area (scene area) of the RAM 22, and the scene data stored in the scene area can be stored into the current area any time.

2. Configuration of Mixing Algorithm

Figure 2:
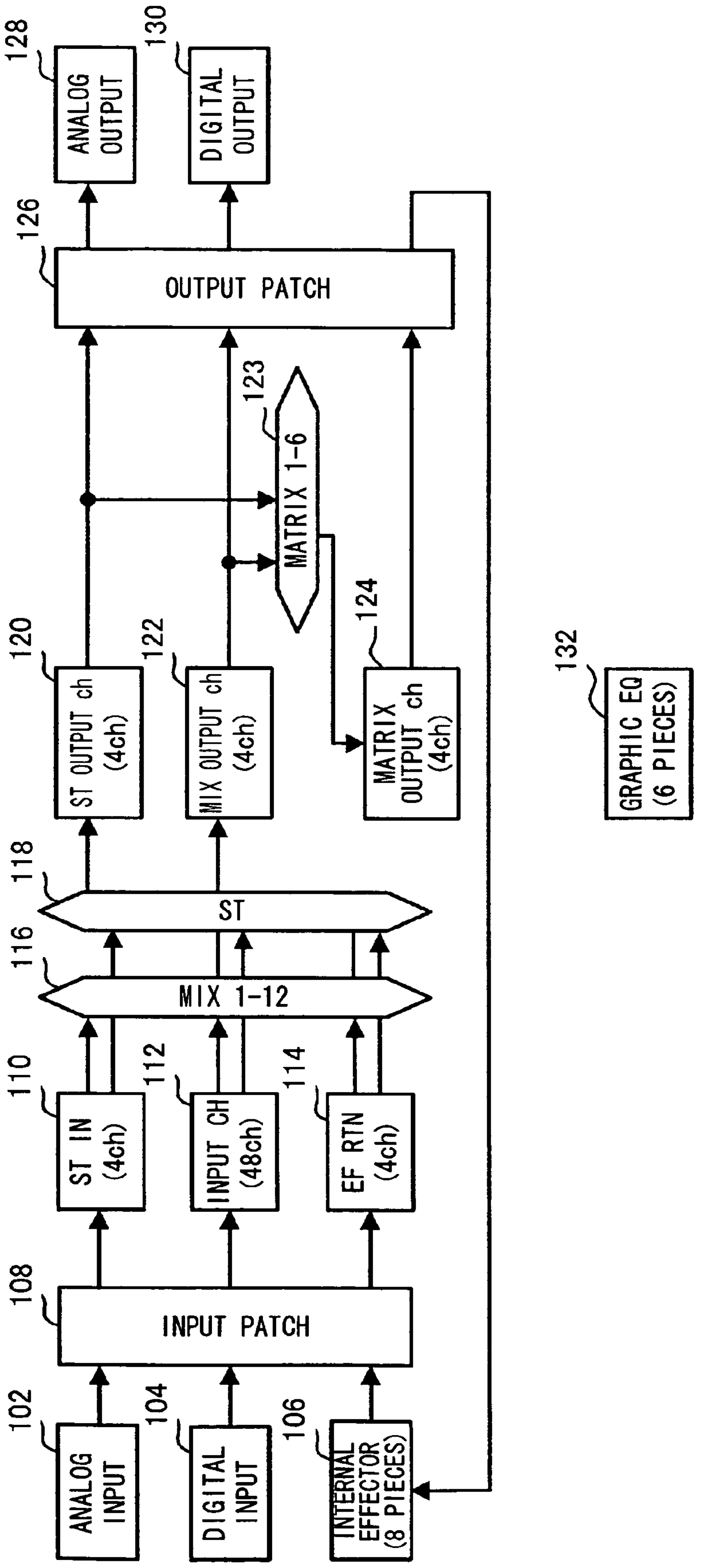

Next, the contents of algorithm realized in the signal processing section 10 and so on will be described with reference to FIG. 2. It is noted that the algorithm is realized by a program set in the signal processing section 10, and the program is downloaded to the signal processing section 10 from the flash memory 20 or the like under the control by the CPU 18. In FIG. 2, 102 denotes an analog input section, and when receiving an analog audio signal at a microphone level or a line level, the analog input section 10 converts the received analog audio signal to a digital audio signal to supply the digital audio signal to the signal processing section 10. 104 denotes a digital input section, and when receiving a digital audio signal, the digital input section 104 converts a format of the received digital audio signal to an internal format of the signal processing section 10. 128 denotes an analog output section that converts a digital audio signal supplied from the signal processing section 10 to an analog audio signal to output the analog audio signal to an external part. 130 denotes a digital output section that converts a digital audio signal in the internal format supplied from the signal processing section 10 to a digital audio signal in a predetermined format (AES/EBU, ADAT, TASCAM or the like) and outputs the resultant digital audio signal.

The configuration described above is realized by the waveform I/O section 8 being hardware structured separately from the signal processing section 10 and by various kinds of cards inserted thereto, but the configuration except the above is realized by the program operating in the signal processing section 10. 112 denotes an input channel adjustment section that adjusts volume, tone, and the like of a maximum of "48" input channels based on the operation of the moving faders and the controls on the operation panel. 110 denotes a stereo input channel adjustment section that adjusts volume, tone, and the like of a maximum of 4 stereo input channels. It is assumed here that "1"-line of stereo audio signal is composed of "2"-right/left lines of audio signals.

114 denotes an effect return section that adjusts volume, tone, and the like of audio signals of "4" channels. The effect return section 114 is assigned mainly to audio signals having undergone the effect processing. 108 denotes an input patch section that assigns digital audio signals supplied from a plurality of input ports such as the input sections 102, 104, etc. to arbitrary input channels of the stereo input channel adjustment section 110, the input channel adjustment section 112, and the effect return section 114. 106 denotes an internal effector section that includes a maximum of "8"-unit effectors and it applies effect processing such as reverb, delay, modulation or the like to a supplied audio signal and supplies the result to the effect return section 114 and so on via the input patch section 108.

116 denotes a MIX bus group that is composed of "12"-line MIX buses. In each of the MIX buses, digital audio signals supplied to the MIX bus, out of digital audio signals of respective input channels, respective stereo input channels, and respective effect returns (hereinafter, referred to as "input channels etc.", are mixed. Whether or not an audio signal in each of the input channels etc. is to be supplied to the MIX buses can be set for each of the MIX buses, and in a case where the audio signal is to be supplied, it is possible to set a send level, a fade mode (pre-fade/post-fade), and so on independently for each line of the MIX buses. 118 denotes a stereo bus that is composed of a "1"-line stereo bus. The configuration of the stereo bus is the same as the aforesaid MIX bus.

120 denotes a stereo output channel section that performs level adjustment and tone adjustment of the mixing result in the stereo bus. 122 denotes a MIX output channel section that performs level adjustment and tone adjustment of the mixing results in the respective MIX buses. 123 denotes a matrix bus group that further mixes output signals of the stereo output channel section 120 and the MIX output channel section 122. 124 denotes a matrix output channel section that performs level adjustment and tone adjustment of the mixing result in the matrix bus group 123. 126 denotes an output patch section that assigns output signals of the stereo output channel section 120, the MIX output channel section 122, and the matrix output channel section 124 to optional units of respective output sections 128, 130 and the aforesaid internal effector section 106. 132 denotes a graphic equalizer section that is composed of a maximum of "6"-unit graphic equalizers. Each of the graphic equalizers is insertable in an arbitrary place of the input channel adjustment section 112, the MIX bus group 116, the stereo bus 118, the matrix bus group 123, the stereo output channel section 120, the MIX output channel section 122, and the matrix output channel section 124 and adjusts a frequency characteristic in the place in which it is inserted. Further, in a case where the graphic equalizer section 132 is inserted in the input channel adjustment section 112, the stereo output channel section 120, or the MIX output channel section 122, it is possible to designate the insertion place more specifically. That is, as the insertion place, it is possible to specify one of "a pre-stage", "a post-stage", or "the middle" of later-described tone adjustment section 150, 170, or 180.

Figure 3:
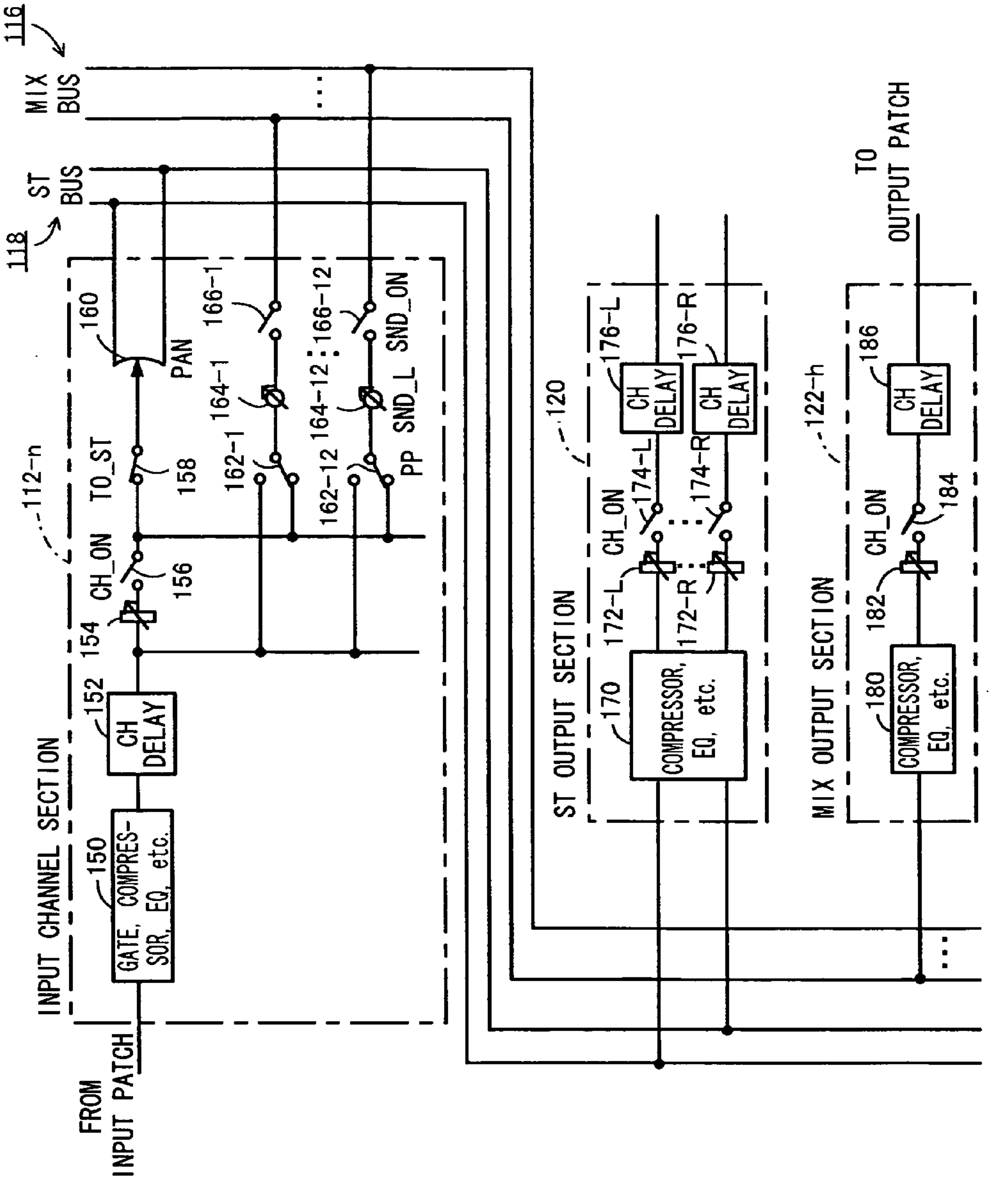
FIG. 3 is a block diagram of a main part of the algorithm in FIG. 2.

Next, the configuration of algorithm in the input channel adjustment section 112, the stereo output channel section 120, and the MIX output channel section 122 will be described in detail with reference to FIG. 3. In FIG. 3, 112-*n* denotes an n-th input channel adjustment section that adjusts tone and volume in an n-th input channel ($1 \leqq n \leqq 48$). Further, 122-*m* denotes an m-th MIX output channel section that adjusts tone and volume in an m-th MIX output channel ($1 \leqq m \leqq 12$). 150 in the n-th input channel adjustment section 112-*n* denotes a tone adjustment section that performs gate processing, compressor processing, equalizer processing, and the like in the n-th input channel. Here, the "gate processing" is processing to automatically cut unnecessary noise, the "compressor processing" is processing to compress or expand a dynamic range, and the "equalizer processing" is processing to set a frequency characteristic of an audio signal of each channel by a parametric equalizer. 152 denotes a channel delay section that delays an audio signal of the n-th input channel as required. 154 denotes a volume adjustment section that adjusts a gain of an audio signal of the n-th input channel. 156 denotes an ON/OFF switching section that switches ON/OFF of the entire n-th input channel.

162-1 to 162-12 denote signal switching sections that switch audio signals which can be outputted to the respective "12"-line MIX buses from the n-th input channel, according to a fade mode. That is, when "pre-fade" is set as the fade mode, an output signal of the channel delay section 152 is selected, and when "post-fade" is set as the fade mode, an output signal of the ON/OFF switching section 156 is selected. 164-1 to 164-12 denote send-level adjustment sections that adjust gains, namely, send levels, of signals to be outputted to the respective MIX buses. 166-1 to 166-12 denote send ON/OFF switching sections that set an ON/OFF state of audio signal supply to the respective MIX buses. 158 denotes a stereo send ON/OFF switching section that switches whether or not to supply an audio signal of the n-th input channel to the stereo bus 118. 160 denotes a PAN setting section that sets right-left volume balance when the audio signal is supplied to the stereo bus 118.

Next, 170 in the stereo output channel section 120 denotes a tone adjustment section that performs limiter processing, compressor processing, equalizer processing, and the like in the stereo output channel. 172-L, R are volume adjustment sections that adjust right and left output gains of the stereo output channel. 174-L, R denote ON/OFF switching sections that switch right and left ON/OFF states of the stereo output channel. 176 denotes a channel delay section that delays an audio signal of the stereo output channel as required. Next, 180 in the m-th MIX output channel section 122-*m* denotes a tone adjustment section that performs limiter processing, compressor processing, equalizer processing, and the like in the m-th MIX output channel. 182 denotes a volume adjustment section that adjusts an output gain of the m-th MIX output channel. 184 denotes an ON/OFF switching section that switches an ON/OFF state of the m-th MIX output channel. 186 denotes a channel delay section that delays an audio signal of the m-th MIX output channel as required.

3. Structure of Panel

Next, an outer structure of a main part of the operation panel of the digital mixer 1 will be described with reference to FIG. 4.

As described above, the digital mixer 1 has the "48" input channels, and these input channels are divided into "4" layers each consisting of "12" channels. Further, the "12" MIX output channels are combined as "1" layer (master layer). Reference numerals 204 to 212 are layer keys each uniquely selecting one of these layers. Further, these keys have internal LEDs, and an LED corresponding to the selected layer is lighted on. It should be noted that, in the present specification, other constituent elements whose name includes "key" all have internal LEDs, and each of the LEDs is lighted on when a parameter relating to the corresponding key becomes an ON state. Further, 240-1 to 240-P denote channel strips which are assigned to the input/output channels belonging to the selected layer, the stereo output channel that needs an operation irrespective of a selection state of the layer, and so on.

242-1 in the channel strip 240-1 denotes a moving fader that adjusts volume of a corresponding input/output channel. That is, if this channel strip is assigned to an input channel, the moving fader 242-1 adjusts a gain of the volume adjustment section 154 (see FIG. 3) corresponding to the input channel. 244-1 denotes an ON/OFF key that sets an ON/OFF state in the ON/OFF switching section 156 of the corresponding input/output channel. 246-1 denotes a solo key that switches whether or not to supply an audio signal of the corresponding input/output channel to a monitoring solo bus (not shown) for monitoring by an operator. Further, 248-1 denotes a SEL key that selectively sets the input/output channel corresponding to the channel strip 240-1 to the "selected state". The selected input/output channel is called "a selected channel".

Here, the "selected state" means a state in which the input/output channel is selected as a channel whose corresponding sound adjustment section 150, signal switching sections 162-1 to 162-12, and so on are to be set in detail. Further, 250-1 denotes a turn knob and in a case where the channel strip 240-1 is assigned to an input channel, the turn knob 250-1 sets right-left volume balance in the PAN setting section 160 corresponding to the input channel. Similarly to the channel strip 240-1, each of the other channel strips has a moving fader, an ON/OFF key, a solo key, a SEL key, and a turn knob.

260 denotes a dynamics adjustment portion for setting the contents of the compressor processing in the tone adjustment sections 150, 170, 180 corresponding to a selected channel. 270 denotes an equalizer adjustment portion for setting the contents of the equalizing processing in the tone adjustment sections 150, 170 and 180 corresponding to the selected channel. 262 and 272 denote select buttons for selecting screen groups involved in the compressor processing and the equalizing processing respectively, as screen groups to be displayed on the large display 14 (to be described in detail later). 280 denotes a select button group that is composed of a plurality of select buttons 280-1 to 280-6 each for selecting a screen group to be displayed on the large display 14. Incidentally, it is also possible to assign the same function as that of each of the aforesaid select buttons 262 and 272 to one of the select buttons 280-1 to 280-6. 30 to 35 under the large display 14 denote tag buttons that are used for selecting the display contents of a setting screen. 38 on the right of the large display 14 denotes a home button to which the same function as the function of any one of the select buttons 280-1 to 280-6 is assigned.

On the large display 14, a screen for detailed settings of the effectors, a channel set to the "selected state", and the like is displayed. 220 to 226 denote cursor buttons for moving a cursor displayed on the large display 14. 230, 232, 233, and 234 denote an increment button, a decrement button, a wheel control, and an enter button respectively, and these buttons constitute part of the aforesaid input device 15. That is, with these constituent elements, operations such as selecting a screen to be displayed on the large display 14, incrementing/decrementing and determining a parameter value in the screen are performed. 236 denotes a touch pad, and 237 and 238 denote touch pad buttons, and they are used instead of a mouse.

4. Operation of Embodiment

4.1 Display Example of Screen (1)

Figure 5:
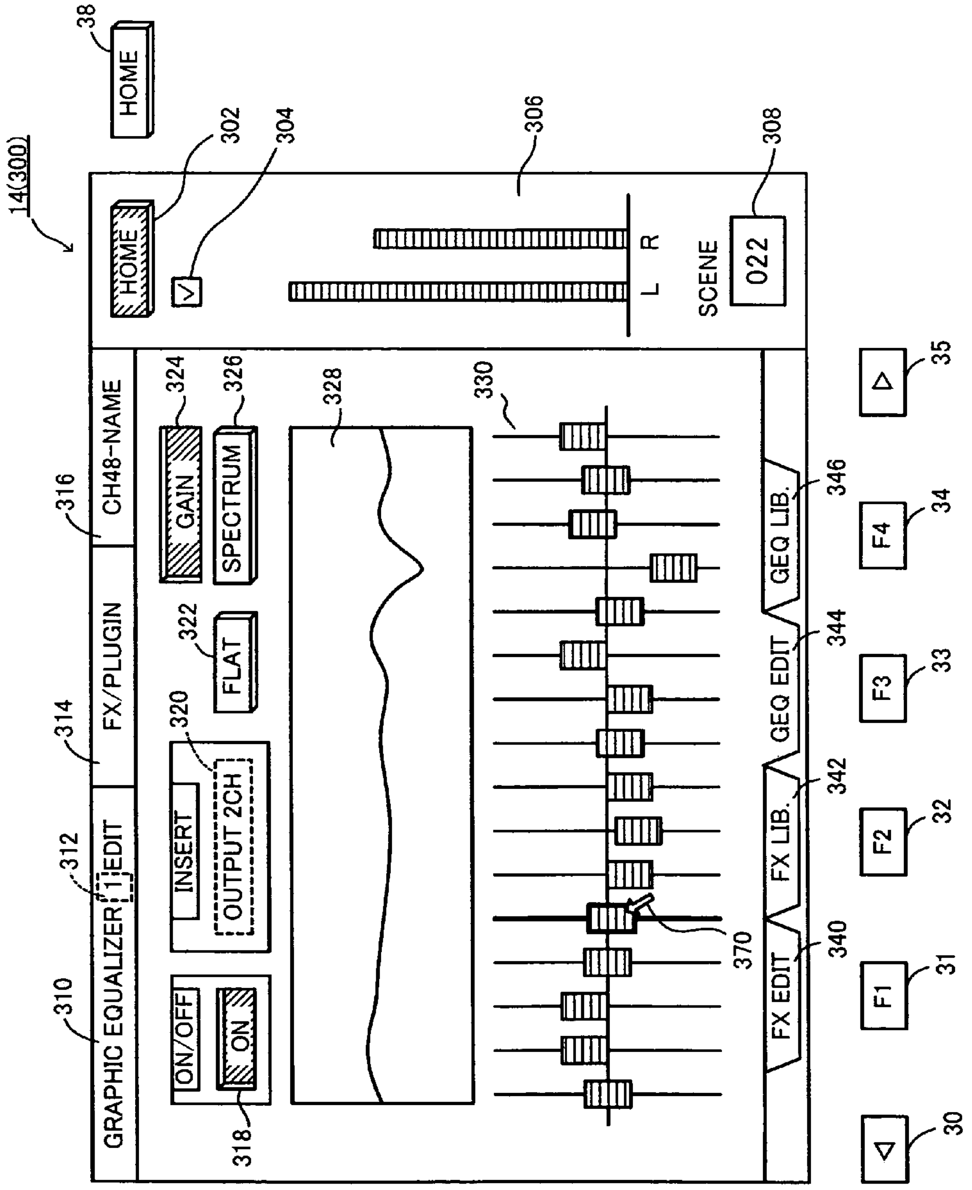
FIG. 5 is a view showing the contents of an internal effect/GEQ setting screen 300.

When the select button 280-1 is pressed in the select button group 280, an internal effect/GEQ setting screen 300 as shown in FIG. 5, for example, is displayed. This screen is a screen for setting states of the internal effector section 106 and the graphic equalizer section 132, and with tag buttons 340 to 346 displayed in the screen, the detailed contents of a screen to be displayed in the large display 14 are determined. More specifically, the tag button 340 corresponds to a state of the internal effector section 106, the tag button 342 corresponds to the contents of a library that serves as a model of the setting of the internal effector section 106, the tag button 344 corresponds to the state of the graphic equalizer section 132, and the tag button 346 corresponds to the contents of a library serving as a model of the setting of the graphic equalizer section 132. In the shown example, with the tag button 344, elements for setting the state of the graphic equalizer section 132 are displayed.

Further, the tag buttons 31 to 34 provided under the large display 14 are assigned the same functions as those of the tag buttons 340 to 346. Further, the tag buttons 30 and 35 are used for scrolling in a case where the number of tags is "5" or more. Hereinafter, a screen specified by each of the tag buttons is referred to as a "tag screen". Further, a group of the tag screens selected through the tags in one screen is referred to as a "screen group". Previously, it was described that when the select button 280-1 is pressed, the internal effect/GEQ setting screen 300 is displayed, but more precisely, with the select button 280-1, a "screen group" for setting the contents of the internal effect and the graphic equalizer is selected. Further, since the home button 38 is assigned the same function as the function of one of the select buttons 280-1 to 280-6 as described above, a screen group selected with the home button 38 is referred to as a "home screen group".

310 denotes a unit name portion that displays a unit name of a setting target (here, the graphic equalizer). 312 denotes a unit number portion for setting and displaying a unit number of the internal effector section 106 or the graphic equalizer section 132. 314 denotes a screen group name portion, in which an abbreviation of the internal effect/GEQ setting screen 300 is displayed. 316 denotes a selected channel number display portion that displays the number of a currently selected channel. Incidentally, the selected channel number does not relate to the set contents in the internal effect/GEQ setting screen 300. 318 denotes an ON/OFF setting portion for setting an ON/OFF state of a setting target unit (a first unit of the graphic equalizer in the shown example). 320 denotes an insertion place setting portion for setting an insertion place of the setting target unit. As described above, as the insertion place, an arbitrary place can be selected from the input channel adjustment section 112, the MIX bus group 116, the stereo bus 118, the matrix bus group 123, the stereo output channel section 120, the MIX output channel section 122, and the matrix output channel section 124, and a more specific insertion place ("pre-stage", "post-stage" or "middle") can be specified in the input channel adjustment section 112, the stereo output channel section 120, and the MIX output channel section 122. In the shown example, the post-stage of the second MIX output channel section 122-2 is set as the insertion place.

328 denotes a graph display portion that displays a frequency characteristic (gain characteristic) in the graphic equalizer or a frequency spectrum of an output signal of the graphic equalizer. Which one of the both is to be displayed can be switched with a gain display button 324 and a spectrum display button 326. 330 denotes a fader portion for adjusting a gain of each audio band. 370 denotes a mouse cursor. 322 denotes a flat setting button for forcibly setting a state of the fader portion 330 flat. 302 denotes a home button, and similarly to the home button 38 on the operation panel, the home button 302 is assigned the same function as the function of one of the select buttons 280-1 to 280-6. 304 denotes a check box for switching, by a toggle, whether or not to make operations of the home buttons 38, 302 effective. 306 denotes a level meter that displays the level of an audio signal of the stereo output channel. 308 denotes a scene number display portion that displays a scene number representing currently called scene data.

4.2 Display Example of Screen (2)

Figure 6:
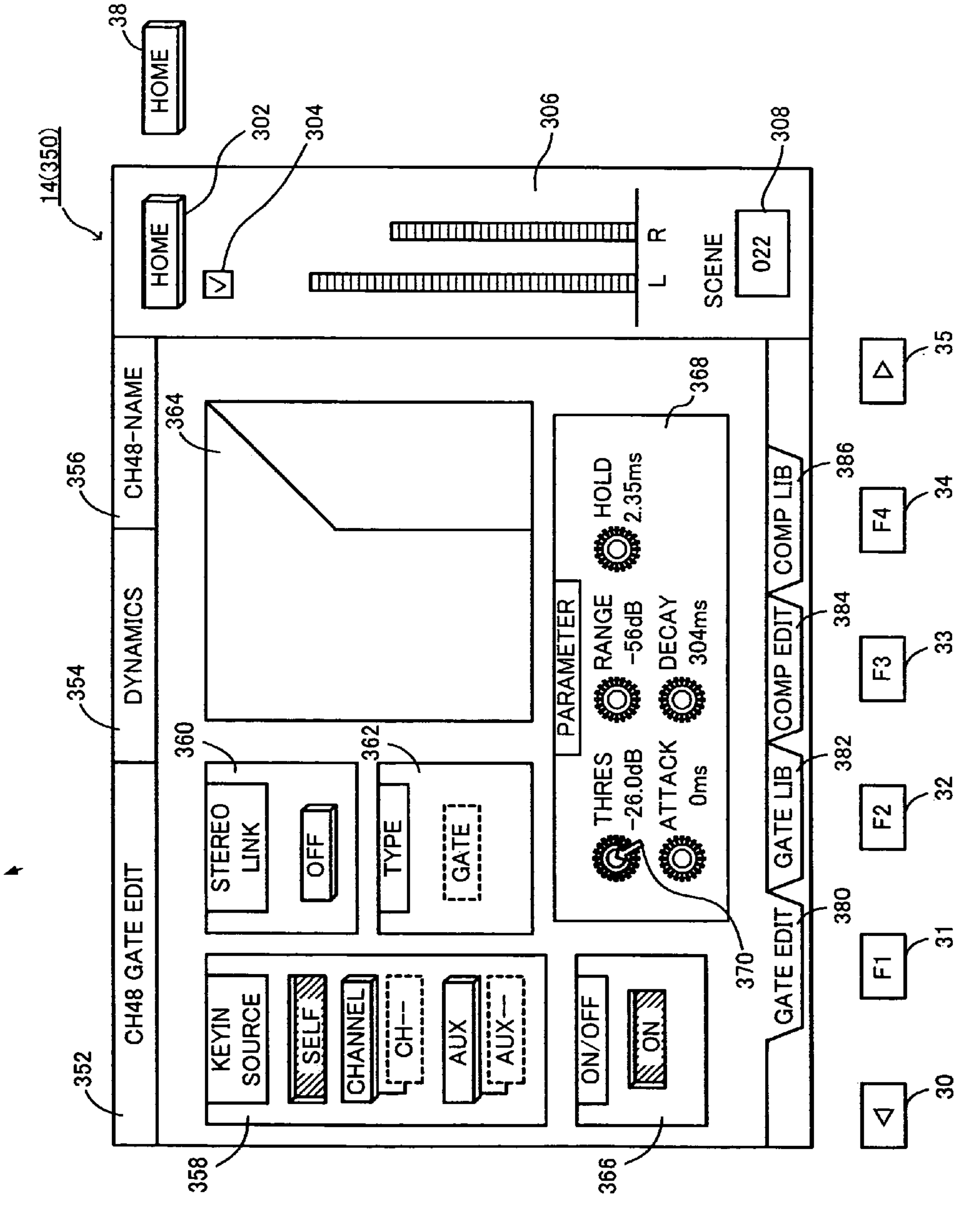
FIG. 6 is a view showing the contents of a dynamics screen 350.

Further, when the select button 262 is pressed in the dynamics adjustment portion 260, a tag screen corresponding to screen data, in a screen group for setting dynamics, is displayed. It is assumed here that a dynamics screen 350 shown in FIG. 6 is displayed. This screen group includes screens for setting the states of the tone adjustment sections 150, 170 and 180 corresponding to a selected channel, in particular, for setting the contents of gate processing and the contents of compressor processing. With a tag button 380, a tag button 382, a tag button 384, and a tag button 386, tag screens corresponding to the state of the gate processing, the contents of a library serving as a model of the gate processing, the state of the compressor processing, and the contents of a library serving as a model of the compressor processing are displayed respectively. FIG. 6 shows an example where the tag button 380 is pressed, whereby the tag screen for setting the gate processing is displayed. Further, as in the example in FIG. 5, the tag buttons 31 to 34 are assigned the same functions as those of the tag buttons 380 to 386.

352 denotes a tag screen name portion, and a selected channel number (CH48) and a tag screen name (GATE EDIT) are displayed therein. 354 denotes a screen group name portion, and a character string "DYNAMICS" which is an abbreviation of the dynamics screen 350 is displayed therein. 356 denotes a selected channel number display portion that displays the number of a selected channel being a processing target. 358 denotes a key-in source setting portion for selecting a source for performing a gate processing in the selected channel. Here, the gate processing is processing to mute an audio signal of a selected channel when the level of an audio signal to be a source becomes at a certain level or lower, and in the key-in "source" setting portion 358, the "source" can be selected from various audio signals. In FIG. 6, "SELF", "CHANNEL", and "AUX" mean that an audio signal supplied to the selected channel itself, an audio signal supplied to a different specified channel, and an audio signal supplied to the corresponding m-th MIX output channel section 122-*m* from one of the MIX buses are selected as the source, respectively. 366 denotes an ON/OFF setting portion for setting an ON/OFF state of a gate. 360 denotes a stereo link portion for setting whether or not two channels considered as a stereo pair are both used as sources for the both.

362 denotes a gate type setting portion for selecting a gate type which is the kind of an applied gate. 368 denotes a parameter setting portion for setting various parameters relating to the gate processing. 364 denotes a graph display portion that displays a gate characteristic as a graph based on the gate type selected in the gate type setting portion 362 and the parameter set in the parameter setting portion 368. As for the home button 302, the check box 304, the level meter 306, and the scene number display portion 308, those in the internal effect/GEQ setting screen 300 are commonly used. However, the home button 302 is lighted on in a case where a displayed screen group is a home screen group (in the drawing, the light-on state is shown by hatching), and in other cases, it is lighted off.

4.3. Various Kinds of Event Processes

Hereinafter, the contents of various kinds of event processes will be described, and first, variables used in these processes will be described. First, unique element numbers b are assigned to all the buttons, turn knobs, and moving faders existing on the operation panel of the digital mixer 1 and to all the elements displayed in the screens on the large display 14. Further, element numbers b assigned to the select buttons 262, 272, 280-1 to 280-6 are particularly called "select button numbers SB". Further, since the screen groups and the select buttons are in one-to-one correspondence, the "select button number SB" uniquely specifies a corresponding screen group.

Further, the element number b of each of the tags is particularly called a "tag number TB". Therefore, tag screens in each of the screen groups are specified by the tag numbers TB. Further, in the internal effect/GEQ setting screen 300 (FIG. 5), the contents of the screen changes depending on each setting target unit. These units are identified by "unit numbers UN". Here, the unit number UN is common in the respective tag screens, but the unit number UN of the graphic equalizer section 132 and the unit number UN of the internal effector section 106 are handled as different. Further, the position of the mouse cursor 370 in each tag screen can be saved independently. Therefore, the cursor position is represented by a "cursor position CP (TB)" with the tag number TB being a suffix.

4.3.1. Select Button Operation Event

Figure 7A:
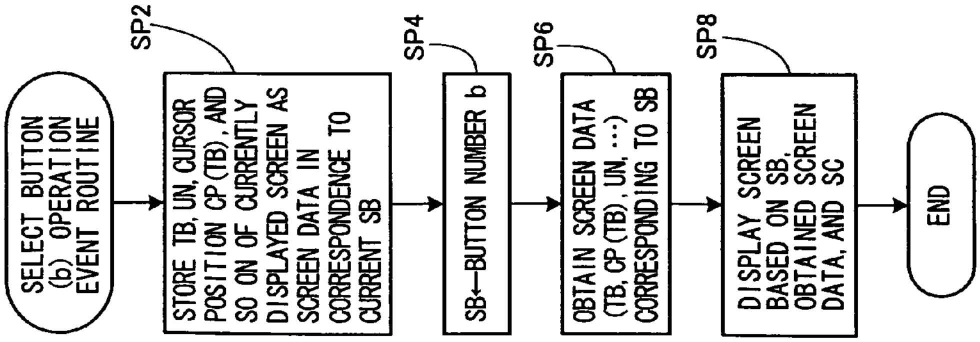
FIG. 7A to FIG. 7D are flowcharts of various event routines in this embodiment.

When one of the select buttons in the select button group 280 is pressed, a select button operation event routine shown in FIG. 7A is activated with the element number b of this select button as an argument. When the process goes to Step SP2 in FIG. 7A, a tag number TB, a unit number UN, a cursor position CP (TB), and other necessary data of a currently displayed tag screen are associated with the select button number SB corresponding to the currently displayed setting screen, and stored into a predetermined area (screen data area) of the RAM 22 as screen data relating to a select button number SB.

Next, when the process goes to Step SP4, the select button number SB is changed to the element number b of the select button that is newly pressed. Next, when the process goes to Step SP6, screen data corresponding to the new select button number SB are read from a screen data area. Next, when the process goes to Step SP8, the contents of a setting screen are constructed based on the select button number SB and the read screen data and are displayed on the large display 14.

Here, when a select button other than the select button 280-1 is pressed in the state where the internal effect/GEQ setting screen 300 is displayed as shown in FIG. 5, a setting screen belonging to another screen group is displayed on the large screen 14. Then, when the select button 280-1 is pressed after various operations are performed in the other setting screen, the setting screen 300 (FIG. 5) is displayed again on the large display 14. It is the feature of this embodiment that the contents of the setting screen 300 displayed again are the same as those of the setting screen 300 displayed last time and in particular, items listed below are reproduced.

(1) the tag number TB (2) the cursor position CP (TB)

(3) the unit number UN

However, as for items listed below, the contents displayed last time are not sometimes saved.

(1) the home button 302: Which of the screen groups is to be selected as the home screen group is data common in all the setting screens. Therefore, when the assignment of the home screen group is changed, the light-on/light-off state of the home button 302 is also sometimes changed.

(2) the check box 304: Since whether or not the home buttons 38 and 302 are to be made effective is also data common in all the setting screens, states thereof are sometimes changed.

(3) the level meter 306: Since the level meter 306 is to display the level of audio signals changing with time, the displayed contents are changed irrespective of the setting screen.

(4) the scene number display portion 308: Since current scene data is data common in the whole digital mixer 1, the contents thereof before and after the re-display sometimes differ.

(5) the state of the selected channel number display portion 316: Since a selected channel is also data common in the whole digital mixer 1, the contents thereof before and after the re-display sometimes differ.

(6) the graph display portion 328 (in a case of spectrum display): In a case where the spectrum display button 326 is ON and a spectrum of an audio signal is displayed on the graph display portion 328, the contents thereof changes according to the state of the audio signal that changes with time.

In this manner, in the present embodiment, the states of almost all the elements before the re-display of the setting screen 300 are held even after the re-display. In particular, the cursor position CP (TB) of the mouse cursor 370 is reproduced, which makes it possible to continue a work without slightest delay when an adjustment work previously performed is to be continued after the re-display.

4.3.2. Tag Button Operation Event

Figure 7B:
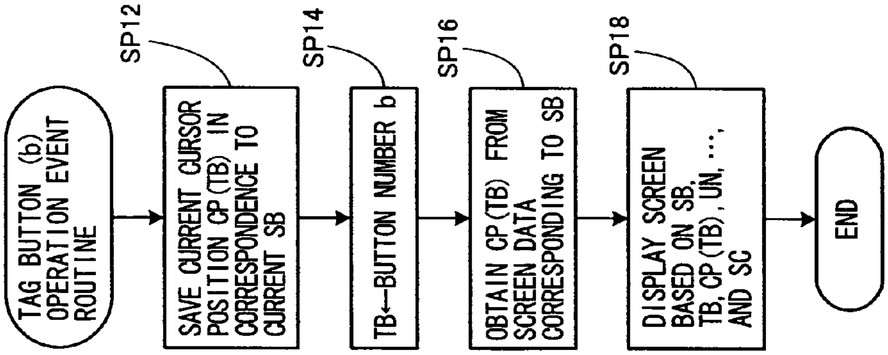

When a corresponding tag button in a setting screen is clicked with the mouse, a tag button operation event routine shown in FIG. 7B is activated. Incidentally, this routine is also activated when any one of the tag buttons 31 to 34 is pressed, but the element number b being an argument for calling this routine is not the element number of the pressed button itself out of the tag buttons 31 to 34 but the element number of a corresponding tag button in the setting screen is used. In FIG. 7B, when the process goes to Step SP12, a cursor position CP (TB) in the current tag screen is stored in a screen data area corresponding to a currently selected button number SB.

Next, when the process goes to Step SP14, the tag number TB is updated to the element number b of the tag button that is newly pressed. Next, when the process goes to Step SP16, a cursor position CP (TB) out of screen data corresponding to the new tag number TB is obtained. Next, when the process goes to Step SP18, a corresponding setting screen is displayed on the large display 14 based on the select button number SB, the tag number TB, the cursor position CP (TB), the unit number UN, the selected channel SC, and so on which are included in the screen data. That is, this setting screen is a tag screen corresponding to the tag number TB, in the screen group corresponding to the select button number SB.

In this manner, in the present embodiment, since the cursor position CP (TB) is saved also when the tag screen is switched, it is possible to continue an adjustment work previously performed, without slightest delay when the original tag screen is displayed again later. When the original tag screen is displayed again, elements whose states before and after the re-display may possibly differ are only the home button 302, the check box 304, the level meter 306, the scene number display portion 308, the selected channel number display portion 316, and the graph display portion 328 (in the case of the spectrum display), similarly to the aforesaid case where the screen group is changed.

Incidentally, at Step SP12 of this routine, unlike the aforesaid Step SP2, the unit number UN is not saved as data corresponding to the tag button, but this does not means that "the unit number UN may possibly have changed when the original tag screen is displayed again later". First, in the screen group involved in dynamics, a tag screen in which the unit number UN of the graphic equalizer may possibly be changed is only a tag screen corresponding to the tag button 344, and a tag screen in which the unit number UN of the effector may possibly be changed is only a tag screen corresponding to the tag button 340. Therefore, there is no special need for the unit number UN to be stored in correspondence to each tag screen, and only by storing the unit number UN in correspondence to the screen group, the display state of the corresponding tag screen can be reproduced.

4.3.3. SEL Key Operation Event

Figure 7C:
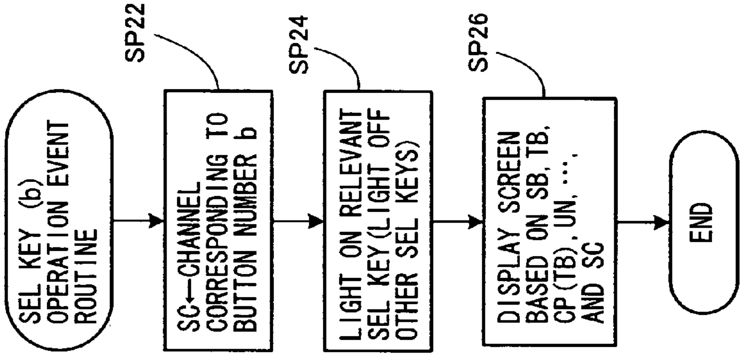

When the SEL key 248-*m* ("m" is one of 1 to P) is pressed, a SEL key operation event routine shown in FIG. 7C is activated. In FIG. 7C, when the process goes to Step SP22, a channel corresponding to the pressed SEL key 248-*m* is set as the selected channel SC. Next, when the process goes to Step SP24, the SEL key 248-*m* is set to a light-on state and the other SEL keys are all set to a light-off state. Next, when the process goes to Step SP26, the contents of the setting screen are changed to the contents corresponding to the new selected channel SC based on the new selected channel SC as well as the select button number SB, the tag number TB, the cursor position CP (TB), and the unit number UN. Since the selected channel SC is data common in the whole digital mixer 1 as described above, the selected channel SC is not recorded as screen data. Further, the operation of the SEL key 248-*m* is effective irrespective of the contents of the screen display in the large display 14, and even when, for example, the internal effect/GEQ setting screen 300 (FIG. 5) or the like not directly relating to the selected channel is displayed on the large display 14, the selected channel is switched in response to the operation of the SEL key 248-*m*.

4.3.4. Unit Selection Event

Figure 7D:
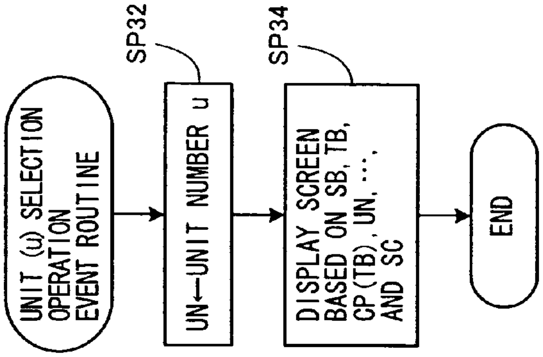

When a unit is selected (when the unit number is set or changed) in the unit number portion 312 of the internal effect/GEQ setting screen 300 (FIG. 5) or the like, a unit selection event routine shown in FIG. 7D is activated. In FIG. 7D, when the process goes to Step SP32, the unit number UN is changed to the unit number of the newly selected unit. Next, when the process goes to Step SP34, the contents of the setting screen are changed to those corresponding to this new unit number UN based on this new unit number UN as well as the select button number SB, the tag number TB, the cursor position CP (TB), and the selected channel SC. Incidentally, the new unit number UN is recorded in screen data corresponding to a screen group currently displayed. Further, the unit selection in the unit number portion 312 is executable only in a screen such as the setting screen 300 relating to a relevant unit, and while a screen not relating to the unit is displayed on the large display 14, the unit selection cannot be changed.

4.3.5. Home Button Operation Event

Figure 8C:
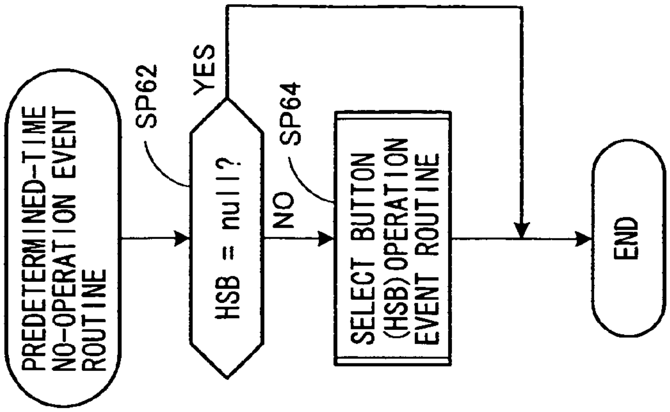
FIG. 8A to FIG. 8C are flowcharts of other event routines in this embodiment.
Figure 8B:
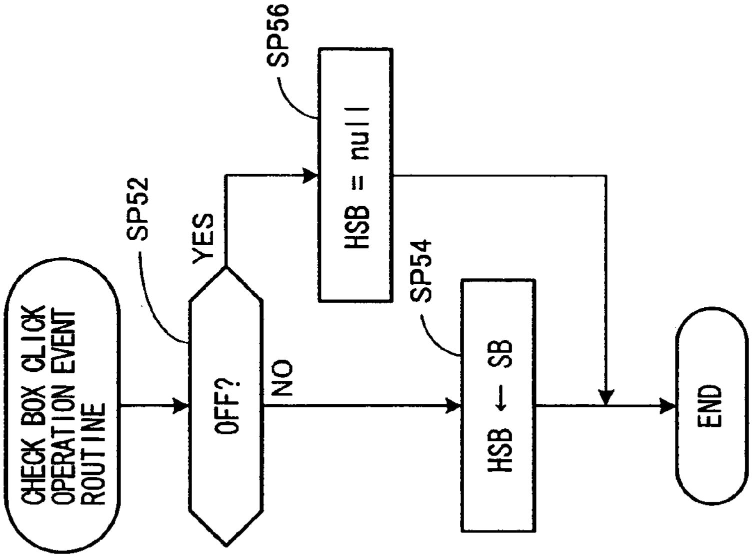
Figure 8A:
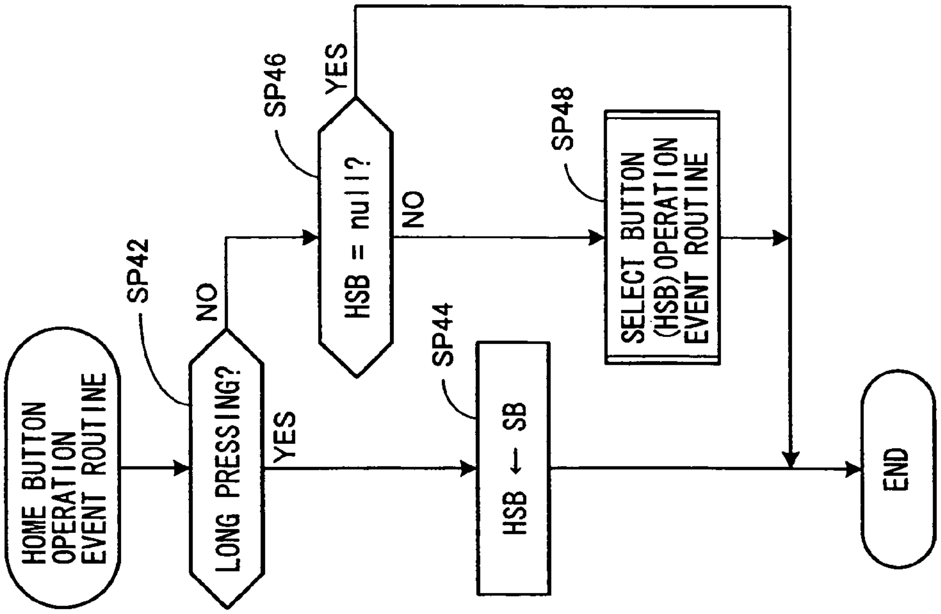

When the home button 302 in a setting screen or the home button 38 on the operation panel is pressed and thereafter released, a home button operation event routine shown in FIG. 8A is activated. In FIG. 8A, when the process goes to Step SP42, it is determined whether or not the home button has been pressed long, that is, whether or not the time from the pressing of the home button to the release thereof is equal to or longer than a predetermined time that is about several seconds. If "NO" here, the process goes to Step SP46, where it is determined whether or not the home button number HSB is null data. If "YES" here, no substantial process is performed and the process of this routine is finished.

On the other hand, if "NO" at Step SP46, the process goes to Step SP48, where the select button operation event routine (FIG. 7A) described above is called with the home button number HSB as an argument. Consequently, a setting screen corresponding to this home button number HSB is displayed on the large display 14. Incidentally, as described above, in this embodiment, the contents of a setting screen, that is, a tag screen, are not specified only by the home button number HSB but the contents of the setting screen are specified based on screen data corresponding to the home button number HSB. On the other hand, when the home button has been pressed long, the process goes to Step SP44, where the home button number HSB is changed to a select button number SB corresponding to the current setting screen. Further, in this event, the check box 304 is forcibly set to an ON state (a state in which the home button is effective).

Therefore, by registering the select button number SB of a frequently used select button as the home button number HSB, a setting screen corresponding to this select button can be displayed on the large display 14 through a one-touch operation. In this embodiment, the contents of a setting screen displayed in response to the operation of the home buttons 38 and 302 are not uniquely specified only by the home button number HSB, but the contents of the setting screen to be displayed are specified based on the tag number TB, the cursor position CP (TB), the unit number UN, the selected channel SC, and so on which are recorded as screen data as described above. Therefore, in a case where an adjustment work having been executed in the home screen group is interrupted and the adjustment relating to the home screen group is continued again after adjustment relating to another screen group is performed, almost all states before the interruption are reproduced, so that the work in the home screen group can be continued without slightest delay.

4.3.6. Check Box Click Event

When the check box 304 is clicked with the mouse, an ON state and an OFF state are switched by the toggle every time it is clicked and a check box click event routine shown in FIG. 8B is further activated thereafter. In FIG. 8B, when the process goes to Step SP52, it is determined whether or not the check box 304 is in the OFF state. If "YES" here, the home button number HSB is set to null data. On the other hand, if "NO" here, the process goes to Step SP54, where the home button number HSB is set to the select button number SB relating to a current setting screen.

4.3.7. Predetermined-Time No-Operation Event

In a case where an operation involving the large display 14 is not performed for a predetermined time or longer that is about several minutes, a predetermined-time no-operation event routine shown in FIG. 8C is activated. In FIG. 8C, when the process goes to Step SP62, it is determined whether or not the home button number HSB is null data. If "YES" here, no substantial process is performed and the process of this routine is finished. On the other hand, if "NO" here, the process goes to Step SP64, where the select button operation event routine described above (FIG. 7A) is called with the home button number HSB as an argument. Consequently, a setting screen corresponding to the home button number HSB is displayed on the large display 14. In this manner, according to this routine, when various kinds of adjustment works are performed in a screen not belonging to the home screen group and the operation involving the large display 14 is not performed thereafter for a predetermined time or longer, the setting screen can be automatically returned to a screen of the home screen group.

5. Modification Example

The invention is not limited to the embodiment described above, and various modifications can be made, for example, as follows.

(1) In the embodiment described above, various kinds of processes (FIG. 7A to FIG. 7D and FIG. 8A to FIG. 8C) are executed by programs operating on the CPU 18, but only these programs may be distributed through a recording medium such as a CD-ROM or a flexible disk storing these programs or may be distributed through a transmission path.

(2) In the embodiment described above, various elements on the large display 14 are operated through the touch pad 236, the mouse, or the like, but a touch screen may be provided on the large display 14 to enable the operation of the elements on the large display 14 via this touch screen.

(3) In the embodiment described above, when the home button is pressed long, the home button number HSB is changed to the select button number SB relating to a current setting screen. However, a method triggering the change of the home button number HSB is not limited to the "long pressing" but any of other various methods may be adopted. An example of other adoptable method is that the concurrent pressing of the home button and a predetermined shift key causes a change of the home button number HSB to the select button number SB corresponding to a current setting screen, and the pressing of the home button without pressing of the shift key causes no change of the home button number HSB irrespective of the pressing time of the home button.

(4) In the embodiment described above, when a select button is pressed (when Step SP2 in FIG. 7A is executed), the tag number TB, the unit number UN, the cursor position CP (TB), and so on of a current tag screen are saved as the screen data. However, the timing for saving such screen data is not limited to the time at which the select button is pressed. For example, in a case where screen data on respective tag screens can be independently stored in the RAM 22, it is possible to update the screen data immediately when some operation is performed in the tag screen. In such a case, since there is no special need for updating the screen data at the timing at which the select button is operated, the process at Step SP2 can be skipped.

According to the digital mixer or the program therefor of the invention as described above, in response to a predetermined home displaying operation of the home button, screen specifying data indicating a screen currently displayed on the display is stored into the memory as screen specifying data corresponding to a screen group to which the currently displayed screen belongs, and a screen indicated by screen specifying data corresponding to a select button indicated by home data is selected and the selected screen is displayed on the display. Therefore, by assigning a frequently used screen group to the home button, it is possible to display, on the display, frequently used screens with such a simple operation as the home displaying operation.

What is claimed is:

1. A digital mixer for processing a plurality of audio signals via a plurality of channels and mixing the audio signals, the digital mixer comprising:

an operation panel including a display that displays a current screen selected among a plurality of screens for setting the processing of the audio signals via the channels, a plurality of select buttons corresponding to a plurality of screen groups respectively, said screens grouped into said screen groups, and a home button;

a memory that stores a plurality of screen specifying data corresponding to the plural screen groups respectively, the screen specifying data of each screen group indicating one screen selected among the plural screens belonging to the screen group, home data indicating one of the select buttons, and current group data indicating a current screen group to which the current screen belongs;

a first display controller that, in response to an operation of one select button out of the plural select buttons by a user, stores data indicating the current screen currently displayed on the display into said memory as the screen specifying data of the current screen group indicated by the current group data, stores data indicating a screen group corresponding to the operated select button in said memory as the current group data, selects a screen indicated by the screen specifying data of the screen group indicated by the current group data, and controls the display to newly display the selected screen as the current screen, such that the current screen group changes to the screen group to which the selected current screen belongs;

a second display controller that, in response to a screen switching operation to the operation panel by the user, selects a screen other than the current screen among the screens belonging to the current screen group, and controls the display to newly display the selected screen as the current screen;

a home assigner that, in response to a home assigning operation to the operation panel by the user, selects one select button among the plural select buttons, and stores data indicating said selected select button in said memory as the home data; and a third display controller that, in response to a home displaying operation of the home button by the user, stores data indicating the current screen currently displayed on the display into said memory as the screen specifying data of the current screen group indicated by the current group data, stores data indicating a screen group corresponding to the select button indicated by the home data in said memory as the current group data, selects a screen indicated by the screen specifying data of the screen group indicated by the current group data, and controls the display to newly display the selected screen as the current screen, such that the current screen group changes to the screen group to which the selected current screen belongs.

2. A digital mixer according to claim 1, the digital mixer further comprising a discriminator that discriminates, when the home button is operated by the user, whether the operation of the home button is the home assigning operation or not according to the manner in which the home button is operated, wherein said third display controller operates in a case where said discriminator discriminates that the operation of the home button is not the home assigning operation, and wherein said home assigner operates in a case where said discriminator discriminates that the operation of the home button is the home assigning operation.

3. A digital mixer according to claim 2, wherein said discriminator detects a time length of the operation of the home button and discriminates that the operation of the home button is the home assigning operation if the time length is equal to or longer than a predetermined time length.

4. A digital mixer according to claim 1, further comprising:

a detector that detects that no operation has been performed in said operation panel for a predetermined time or longer; and a fourth display controller that, when said detector detects that no operation has been performed in said operation panel for the predetermined time or longer, stores data indicating a screen currently displayed on the display, into said memory as the screen specifying data of the current screen group, selects the screen indicated by the screen specifying data of the screen group corresponding to the select button indicated by the home data, and controls the display to display the selected screen as the current screen, such that the current screen group changes to the screen group to which the selected current screen belongs.

5. A digital mixer according to claim 1, further comprising a channel selector that selects one channel among the channels, wherein each of said first to third display controllers controls the display to display a state of the processing of the channel selected by said channel selector on the current screen, and wherein the channel selection by the channel selector is not affected by the screen selection by any of the said first to third display controllers.

6. A machine-readable storage medium containing program instructions executable by a processor which is provided in a digital mixer comprising an operation panel including a display that displays a current screen selected among a plurality of screens for setting the processing of the audio signals via the channels, a plurality of select buttons corresponding to a plurality of screen groups respectively, said screens grouped into said screen groups, a home button; and a memory that stores a plurality of screen specifying data corresponding to the plural screen groups respectively, the each screen specifying data of each screen group indicating one screen selected among the plural screens belonging to the screen group, home data indicating one of the select buttons, and current group data indicating a current screen group to which the current screen belongs, the program instructions causing said processor to execute:

a first display control process that, in response to an operation of one select button out of the plural select buttons by a user, stores data indicating the current screen currently displayed on the display, into said memory as the screen specifying data of the current screen group indicated by the current group data, stores data indicating a screen group corresponding to the operated select button in said memory as the current group data, selects a screen indicated by the screen specifying data of the screen group indicated by the current group data, and controls the display to newly display the selected screen as the current screen, such that the current screen group changes to the screen group to which the selected current screen belongs;

a second display control process that, in response to a screen switching operation to the operation panel by the user, selects a screen other than the current screen among the screens belonging to the current screen group, and controls the display to newly display the selected screen as the current screen;

a home assigning process that, in response to a home assigning operation to the operation panel by the user, selects one select button among the plural select buttons, and stores data indicating said selected select button in said memory as the home data; and a third display control process that, in response to a home displaying operation of the home button by the user, stores data indicating the current screen currently displayed on the display, into said memory as the screen specifying data of the current screen group indicated by the current group stores data indicating a screen group corresponding to the select button indicated by the home data in said memory as the current group data, selects a screen indicated by the screen specifying data of the screen group indicated by the current group data, and controls the display to newly display the selected screen as the current screen, such that the current screen group changes to the screen group to which the selected current screen belongs.

* * * * *